United States Patent [19]

Whitehorn et al.

[11] Patent Number: 5,119,670
[45] Date of Patent: Jun. 9, 1992

[54] CRANKSHAFT ANGULAR POSITION DETECTING APPARATUS

[75] Inventors: Michael L. Whitehorn, Kokomo, Ind.; Mark C. Hansen, Ann Arbor, Mich.; Walter K. Kosiak, Kokomo, Ind.

[73] Assignee: Delco Electronics Corporation, Kokomo, Ind.

[21] Appl. No.: 635,848

[22] Filed: Jan. 2, 1991

[51] Int. Cl.⁵ .................................. G01M 15/00
[52] U.S. Cl. .................................................. 73/116
[58] Field of Search .............. 73/116, 117.2, 117.3; 324/207.2, 207.22, 207.25; 123/612–617; 250/231.18

[56] References Cited

U.S. PATENT DOCUMENTS

| | | | |
|---|---|---|---|
| 4,365,602 | 12/1982 | Stiller et al. | 123/414 |
| 4,558,591 | 12/1985 | Francis et al. | 73/116 |
| 4,656,993 | 4/1987 | Yuzawa et al. | 123/643 |
| 4,690,124 | 9/1987 | Higashiyama | 123/643 |

FOREIGN PATENT DOCUMENTS 0058478  5/1979  Japan .................... 324/207.25

Primary Examiner—Robert Haevis
Attorney, Agent, or Firm—Creighton R. Meland

[57] ABSTRACT

Apparatus for developing digital signals that respectively represent a plurality of different angular positions of the crankshaft of an internal combustion engine. The crankshaft drives two slotted wheels that are each associated with a sensor. Two pulse trains are developed. The first pulse train is a series of equally angularly spaced pulses. The second pulse train is comprised of a plurality of angularly spaced window pulses of different widths. Pulse falling edges of the first pulse train are counted over the duration of the windows of the second pulse train to develop digital signals that represent angular positions of the crankshaft. The system prevents edge counting until a valid edge of window pulse is detected.

4 Claims, 2 Drawing Sheets

CRANKSHAFT ANGULAR POSITION DETECTING APPARATUS

This invention relates to an engine crankshaft angular position detecting apparatus, and more particularly to an angular position detecting apparatus for controlling a distributorless ignition system.

Distributorless ignition systems that utilize a plurality of ignition coils where each coil is associated respectively with two engine cylinders are well known. In such systems, the spark plugs associated with two cylinders are fired simultaneously from one ignition coil and the system selectively enables a given ignition coil as a function of engine crankshaft position. In order to quickly start an engine, the system should identify the ignition coil to be first enabled during a minimum amount of initial angular rotation of the engine crankshaft.

This invention includes apparatus for quickly identifying the first cylinder pair to be fired. Thus, in accordance with this invention, the crankshaft of the engine drives two wheels that are respectively associated with a sensor. One wheel-sensor combination provides a first pulse train that is comprised of a series of equally spaced pulses that are produced during each revolution of the crankshaft. For a six-cylinder engine, eighteen pulses can be produced for each revolution of the crankshaft of the engine. The other wheel-sensor combination produces a second train of pulses comprised of pulses that only occur at certain angular positions of the crankshaft. Thus, for a six-cylinder engine, three angularly spaced square wave pulses are produced for each revolution of the crankshaft. These square wave pulses in effect provide windows of varying angular width and by counting the number of transitions or edges of the first pulse train that occur during a window of the second pulse train, an ignition coil can be enabled or selected that corresponds to a predetermined position of the crankshaft.

A problem associated with counting edges of the first pulse train that occur during windows of the second pulse train is that an incorrect count might be counted if the counting of the edges of the first pulse train begins during the window of the second pulse train. Thus, for example, if one of the windows of the second pulse train is thirty angular degrees wide and the first pulse train is comprised of eighteen equally spaced pulses one, two or three edges of the first pulse train could be counted if counting begins randomly during the thirty degree window. To prevent incorrect edge counting of the pulses of the first pulse train during a window of the second pulse train, this invention includes means for preventing counting of the edges of the first pulse train until a valid transition or edge of a window pulse of the second pulse train is detected.

IN THE DRAWINGS

Figure 1:
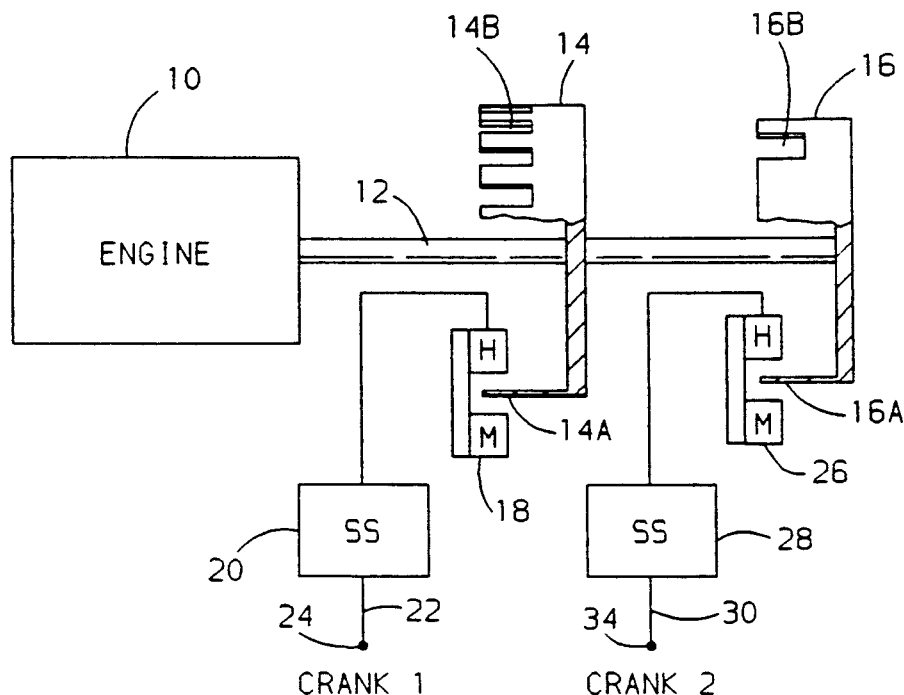
FIG. 1 illustrates engine crankshaft position detecting apparatus for developing two pulse trains related to engine crankshaft position.

Referring now to the drawings, and more particularly to FIG. 1, the reference numeral 10 designates a spark ignited internal combustion engine which for purposes of explanation of this invention is a six-cylinder engine. The engine 10 has a crankshaft 12 which drives two wheels 14 and 16 that are formed of magnetic material such as steel.

The wheel 14 has an annular rim 14A which rotates through a gap in a fixed Hall effect sensor 18. This sensor has a Hall effect device H and a permanent magnet M that are aligned with each other. The rim 14A has eighteen slots and eighteen teeth. The slots are designated as 14B and some of the eighteen slots are shown in FIG. 1. Each slot and tooth is about ten angular degrees wide. As the crankshaft 12 rotates, the rim 14A rotates between the Hall effect device and magnet to alternately allow flux developed by the magnet to intercept the Hall effect device or be shunted away from the Hall effect device.

Figure 3:
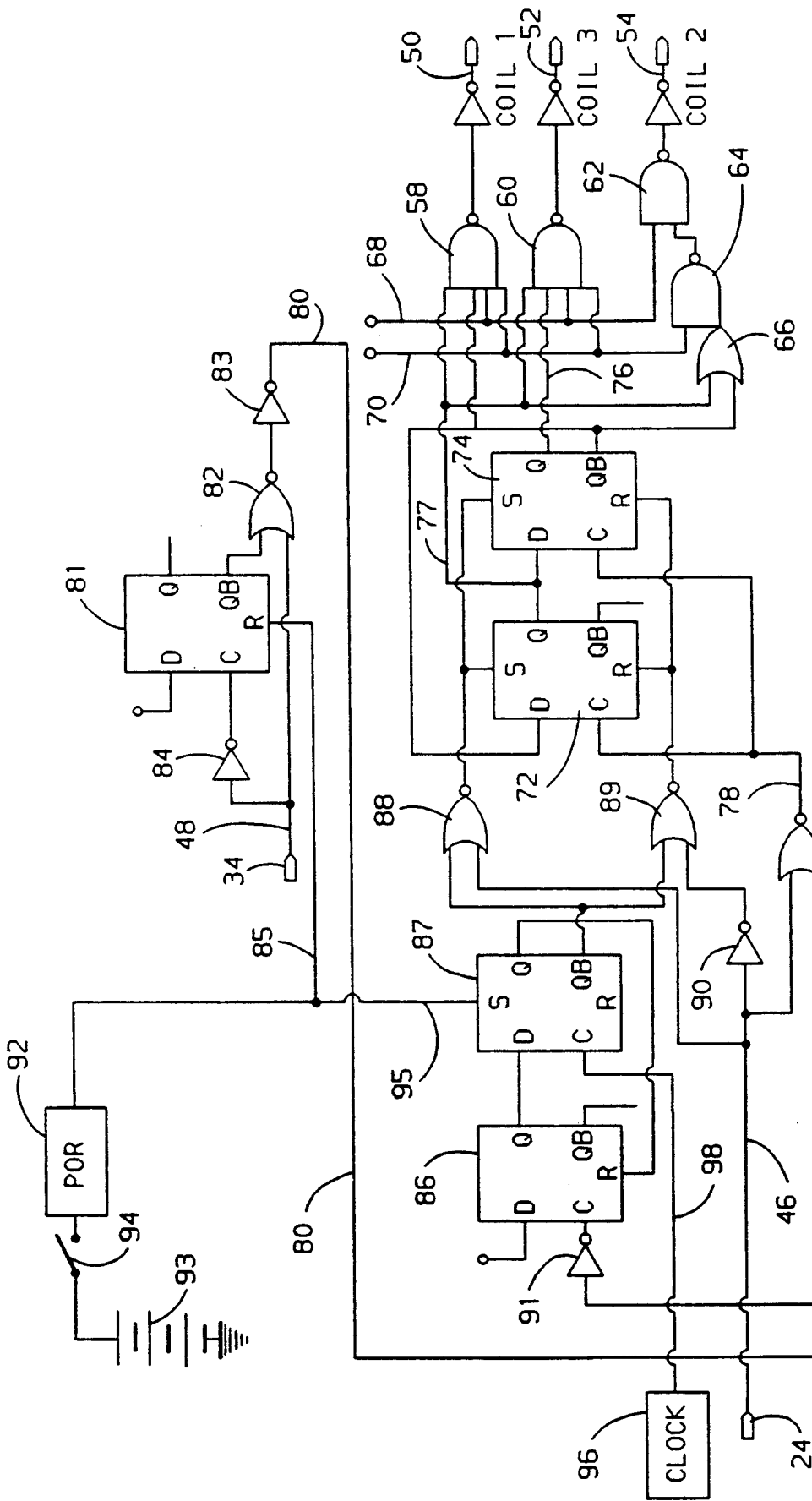
FIG. 3 illustrates a digital logic circuit for identifying engine crankshaft positions from the pulse trains shown in FIG. 2.

The Hall effect device H of sensor 18 is connected to a signal shaping circuit 20 which, in turn, is connected to an output conductor 22. Conductor 22 is connected to a junction 24. Junction 24 is also illustrated in FIG. 3.

Figure 2:
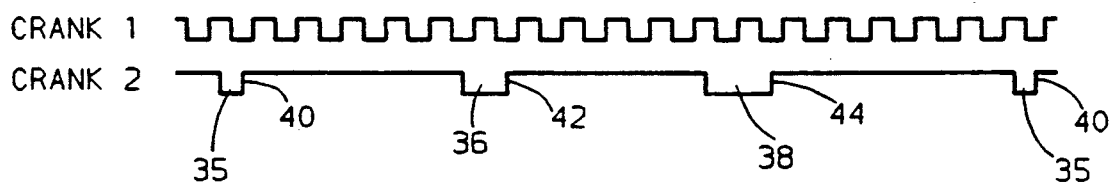
FIG. 2 illustrates the pulse trains developed by the apparatus shown in FIG. 1 as a function of crankshaft angular position.

The pulse waveform that is developed on line 22 as crankshaft 12 rotates is shown in FIG. 2, where it is identified as CRANK 1. This waveform goes alternately high and low for rotation angles of the crankshaft of ten degrees. Thus, during one revolution of crankshaft 12, there will be eighteen alternately occurring high and low periods which are each ten degrees wide.

The other wheel 16 is associated with another Hall effect sensor 26 having a Hall effect device H and a permanent magnet M. The annular rim 16A of wheel 16 rotates through the gap between the Hall effect device H and magnet M. Rim 16 has three angularly spaced slots 16B only one of which is illustrated in FIG. 1. The remainder of the rim is solid. The three slots are respectfully ten, twenty and thirty degrees wide.

The Hall effect device H of sensor 26 is connected to signal shaping circuit 28 which has an output connected to line 30. Line 30 is connected to junction 34 which is also illustrated in FIG. 3.

The pulse train due to rotation of wheel 16 that is developed as crankshaft 12 rotates is shown in FIG. 2 and identified as CRANK 2. This pulse train has three angularly spaced low periods 35, 36 and 38. Period 35 is ten angular degrees wide and periods 36 and 38 are respectively twenty and thirty degrees wide. These low periods occur when a corresponding slot in rim 16A is between the Hall effect sensor and the magnet. The edge transitions 40, 42 and 44 occur respectively at 75 degrees before top dead center of a given cylinder pair. It can be seen that the transitions of CRANK 2 always occurs five degrees after (or one half way between) the transitions of CRANK 1.

Referring now to FIG. 3, a synchronous digital logic circuit is illustrated that identifies an ignition coil to be enabled as a function of crankshaft angular position from the CRANK 1 and CRANK 2 waveforms. In FIG. 3, junctions 24 and 34 (also shown in FIG. 1) are illustrated connected respectively to lines 46 and 48. Accordingly, line 46 has the CRANK 1 waveform applied thereto and line 48 has the CRANK 2 waveform applied thereto.

The output of the circuit shown in FIG. 3 is comprised of lines 50, 52 and 54 also identified as COIL 1, COIL 3 and COIL 2. Each of these lines is connected to known apparatus that controls energization of the primary winding of one ignition coil. Thus, in a six-cylinder engine, there are three ignition coils for one each cylinder pair. The lines 50-54 selectively enable energization of only one ignition coil at a time.

Line 50 is connected to the output of a NAND gate 58 through an inverter. Line 52 is connected to the output of NAND gate 60 through an inverter. Line 54 is connected to the output of NAND gate 62 through an inverter. One input of NAND gate 62 is from NAND gate 64. One input to NAND gate 64 is from OR gate 66.

One of the inputs of NAND gates 58, 60 and 62 are connected respectively to a conductor or line 68. Conductor 70 is connected respectively to inputs of NAND gates 58, 60 and 64.

The logic circuitry of FIG. 3 has two D-type flip-flops 72 and 74. The Q output of flip-flop 74 is connected to line 76 which, in turn, is connected to an input of NAND gate 60. The Q output of flip-flop 72 is connected to the D input of flip-flop 74 and to a line 77. Line 77 is connected to an input of NAND gate 58, NAND gate 60 and NOR gate 66.

The clock input C of flip-flop 74 and flip-flop 72 are both connected to a line 78. Line 78 is connected to the output of a NOR gate 79. One input to NOR gate 79 is the CRANK 1 signal from line 46. The other input of gate 79 is connected to a line 80.

The signal on line 80 is developed by a circuit comprised of D-type flip-flop 81, NOR gate 82, and inverters 83 and 84. A power-on reset line 85 is connected to the R input of flip-flop 81. The CRANK 2 signal on line 48 is connected to inverter 84 and to one input of gate 82. The inverter 84 is connected to the clock input C of flip-flop 81. The QB output of flip-flop 81 is connected to one input of gate 82. The output of gate 82 is connected to inverter 83 and it, in turn, is connected to line 80.

The FIG. 3 logic circuit has two D-type flip-flops 86 and 87. The QB output of flip-flop 87 is connected to inputs of NOR gates 88 and 89. The output of NOR gate 89 is connected to the reset terminals R of flip-flops 72 and 74. The output of gate 88 is connected to the set terminals S of flip-flops 72 and 74. The line 46 is connected to an input of gate 88 and to an input of gate 89 through inverter 90. Line 46 is also connected to an input of gate 88. The Q output of flip-flop 87 is connected to the R terminal of flip-flop 86.

The line 80 connected to the clock input C of flip-flop 86 via inverter 91.

The circuit of FIG. 3 has a power-on reset circuit 92 connected to the battery 93 on the vehicle through ignition switch 94. POR circuit 92 is connected to lines 85 and 95. Line 95 is connected to the set terminal S of flip-flop 87. The logic circuit of FIG. 3 is energized from battery 93 by circuitry (not illustrated) when switch 94 is closed. Thus, the FIG. 3 circuit is powered-up when switch 94 is closed and at power-up flip-flop 81 is reset as explained in more detail hereinafter.

The circuit of FIG. 3 has a clock pulse source 96 that is connected to the clock terminal C of flip-flop 87 by line 98. The frequency of the clock pulses developed by clock pulse source 96 may be about 125 KHz. Clock 96 is the system clock.

The logic circuit of FIG. 3 counts the edges of the CRANK 1 signal while the CRANK 2 signal is low. It can be seen from FIG. 2 that if power-up occurs when the CRANK 2 signal is low, one could not properly count the edges of the CRANK 1 signal before the rise of CRANK 2. For example, with the thirty degree pulse 38, the circuit might see one, two or three edges, depending on where the power-up started. The circuit comprised of flip-flop 81, gate 82 and inverters 83 and 84 protects against the type of improper operation that has been described. The operation of the FIG. 3 circuit will now be described.

On power-up, (closure of ignition switch 94) flip-flop 81 is reset. This brings the QB output of flip-flop 81 high, so that the signal on line 80 is forced high. Only when a falling edge of CRANK 2 is seen, does the rising edge of the output of inverter 84 cause the flip-flop 81 to clock high. This brings QB low, releasing the signal on line 80 to follow the CRANK 2 signal on line 48. Until another power-up, the signal on line 80 will exactly follow the signal on line 48. This logic guarantees that on a power-up, no edge counting of the CRANK 1 signal will occur until a valid falling edge of CRANK 2 starts the event. The signal on line 80 is the signal that represents CRANK 2 for all the following logic. This signal on line 80 will be referred to hereinafter as CR2F.

Every time CR2F falls, the flip-flop 86 will be clocked to a high state (Q=1). The output of clock 96 will then clock this 1 into flip-flop 87. This will cause the Q output 87 to go high, which then resets the output of 87 (Q=0). The next rising edge of the clock signal from clock 96 will then clock this 0 into the flip-flop 87, bringing the Q output of 87 back low. This takes the reset of 86 low, which allows the next falling edge of CR2F to start the sequence over again.

The flip-flops 72 and 74 form a counter. The flip-flops 86 and 87 form a synchronous one-shot that pulses every time the CR2F falls. The one one-shot presets the 72-74 counter for proper counting. It is pointed out that the QB output of 87 is applied to NOR gates 88 and 89. When QB of 87 goes low, either the output of gate 88 or 89 will go high, depending on whether CRANK 1 is low or high. If CRANK 1 is high, the output of 89 will go high and counter 72-74 will be reset to a 0,0 count. This 0,0 count means that lines 77 and 76 connected to counter 72-74 are both at 0 logic levels. If CRANK 1 is low, the output of gate 88 will go high and counter 72-74 will be set to a 1,1 count. Since CRANK 2 falls five degrees after a CRANK 1 transition, the one-shot event is guaranteed to occur when CRANK 1 is at a steady state condition.

The signal on line 78 (output of 79) is the clock for the 72-74 counter. All rising edges of the signal on line 78 will advance the counter 72-74 to its next state. While CR2F is high, the signal on line 78 is held low, so no counting can occur. While CR2F is low, every falling edge of CRANK 1 will cause the signal on line 78 to rise advancing the counter one count. The counter 72-74 is connected in a modulo four configuration and thus the counter advances through the states 0,0 to 1,0 to 1,1 to 0,1 to 0,0 etc.

The detection of the ten degree period or waveform 35 will now be described. When CRANK 2 falls, CRANK 1 is high. Therefore, the one-shot (86-87) will reset the counter 72-74 through gate 89 to a 0,0 state. While CR2F is low, there is only one falling edge of the CRANK 1 waveform. This will advance counter 72-74 from 0,0 to 1,0. CRANK 2 will then rise, disabling future CRANK 1 clock pulses. The final state of the counter for the ten degree period 35 is 1,0.

The detection of the twenty degree period or waveform 36 will now be described. When CRANK 2 falls, CRANK 1 is low. Therefore, the one-shot (86-87) will set the counter 72-74 through gate 88, to a 1,1 state. While CR2F is low, there is again only one falling edge of CRANK 1. This will advance the counter from 1,1 to 0,1. CRANK 2 will then rise, disabling future CRANK 1 clock pulses. It is noted that there is an extra rising edge at the output of gate 79 when CR2F falls. The first rising edge actually advances counter 72-74 one count. Since the one-shot (86-87) then presets the counter 72-74 to a 1,1 state, this extra clock does not matter. The falling edge of CRANK 1 then advances the count to the proper state. The final counter state for the twenty degree period 36 is 0,1.

The detection of the thirty degree period or waveform 38 will now be described. When CRANK 2 falls, CRANK 1 is high. Therefore, the one-shot 86-87 will reset the counter 72-74 through gate 89 to a 0,0 state. While CR2F is low there are two CRANK 1 falling edges. This will advance counter 72-74 from 0,0 to 1,0 to 1,1. CRANK 2 will then rise, disabling future CRANK 1 clock pulses. The final counter state for the thirty degree period is 1,1.

The system of this invention can be used with apparatus (not illustrated) for detecting the proper direction of rotation of crankshaft 12 and wheels 14 and 16. Where such an apparatus is utilized, it applies a SYNC signal to line 68 allowing gates 58-62 to energize the coils when the direction of rotation of crankshaft 12 is proper. Line 68 is used to pass the proper cylinder information on to the known apparatus that controls energization of the ignition coils.

The use of line 70 is also optional. Line 70, if used, is adapted to be connected to a camshaft sensor (not illustrated). The signal developed by this sensor, CAMHIGH, can be used as a back-up in case the CRANK 2 signal is lost. The CAM signal developed by the camshaft sensor tells the engine electronics which of two revolutions the engine is in. The CAM signal is normally high and goes low one time every two crankshaft revolutions. It goes low at the same place CRANK 2 has its twenty degree window. For this reason, when the CAM input is used, it should only assert the COIL 2 signal.

The CAMHIGH signal will go low at ninety degrees BTDC. Twenty degrees later, a SYNC pulse is applied to line 68 if the direction of engine rotation is correct. CAMHIGH in the low state will keep COIL 1 and COIL 3 low and will cause the output of gate 64 to go high, enabling the SYNC signal on line 68 to bring COIL 2 high. At all other times, the CAMHIGH signal is high and a SYNC pulse gates whichever state is seen on counter 72-74.

The SYNC signal (proper crankshaft rotation) can be developed at seventy degrees BTDC. The output of gate 58 will go low when the Q output of 72, the QB output of 74, SYNC and CAMHIGH are all high. This represents a ten degree 1,0 state. The output of gate 60 will go low when the Q output of 72, Q output of 74, SYNC and CAMHIGH are all high. This represents a thirty degree or 1,1 state. The output of gate 62 will go low when the Q output of 72 and the QB output of 74 are both low, and SYNC and CAMHIGH are high. This represents a twenty degree 0,1 state.

In FIG. 1, Hall effect sensors have been disclosed for developing, in conjunction with slotted wheels 14 and 16, the CRANK 1 and CRANK 2 pulse trains. The crankshaft sensing arrangement could be of the type disclosed, for example, in the Kiess et al U.S. Pat. No. 4,508,092, where a sensor uses one permanent magnet and two Hall effect devices. Moreover, sensors other than Hall effect devices could be used to produce the CRANK 1 and CRANK 2 pulse trains.

The flip-flop 81 is a memory element, since it can store binary information.

The embodiments of the invention in which an exclusive property or privilege is claimed are defined as follows:

1. Apparatus for providing a plurality of different digital signals that represent respectively predetermined angular positions of the crankshaft of an internal combustion engine comprising, in combination, an internal combustion engine having a crankshaft, a first sensor means, means connected to an rotatably driven by said crankshaft past said first sensor means for producing in said first sensor means, in response to rotation of said crankshaft, a first pulse train comprised of a series of square wave pulses defined by first rising and first falling edges, second sensor means, means connected to and rotatably driven by said crankshaft past said second sensor means for producing in said second sensor means, in response to crankshaft rotation, a second pulse train comprised of a plurality of square wave window pulses that respectively occur at predetermined angularly spaced positions of said crankshaft, each said square wave window pulse being defined by leading and trailing second edges, the spacing of said leading and trailing second edges of respective window pulses that occur at respective different angular positions of said crankshaft all being different from each other, the phase relationship of said pulse trains being such that a predetermined number of said first falling edges of said first pulse train occur between the occurrence of said leading and trailing second edges of a given square wave window pulse, a digital logic circuit connected to receive said first and second pulse trains including means for counting the number of said first falling edges of said first pulse rain that occur during the duration of respective square wave window pulses, said logic circuit including means developing different digital signals that respectively represent a plurality of different crankshaft positions in response to said counting of said first falling edges, and means for preventing counting of any of said first falling edges of said first pulse train that occur at any rotative position of said crankshaft until said crankshaft has rotated to a position where a leading edge of one of said square window pulses occurs, said last named means comprising a memory element that is reset to a predetermined logic state at power-up of said logic circuit.

2. The apparatus according to claim 1 where said first pulse train is comprised of a series of equal angularly spaced square wave pulses that are developed continuously during one revolution of said crankshaft.

3. The apparatus according to claim 1 where the said means for counting said first falling edges comprises a plurality of flip-flops.

4. The apparatus according to claim 1 where said memory element is a flip-flop.

* * * * *